United States Patent
Miretti et al.

(10) Patent No.: US 11,146,316 B2
(45) Date of Patent: Oct. 12, 2021

(54) CHANNEL COVARIANCE MATRIX CONVERSION

(71) Applicants: Huawei Technologies Co., Ltd., Shenzhen (CN); FRAUNHOFER-GESELLSCHAFT ZUR FÖRDERUNG DER ANGEWANDTEN FORSCHUNG E.V., Munich (DE)

(72) Inventors: Lorenzo Miretti, Berlin (DE); Renato Luis Garrido Cavalcante, Berlin (DE); Slawomir Stanczak, Berlin (DE); Qing Liu, Munich (DE)

(73) Assignees: Huawei Technologies Co., Ltd., Shenzhen (CN); FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/061,218

(22) Filed: Oct. 1, 2020

(65) Prior Publication Data

US 2021/0021310 A1    Jan. 21, 2021

Related U.S. Application Data

(63) Continuation of application No. PCT/EP2018/059441, filed on Apr. 12, 2018.

(51) Int. Cl.
*H04B 7/02* (2018.01)
*H04B 7/0456* (2017.01)
(Continued)

(52) U.S. Cl.
CPC ......... *H04B 7/0456* (2013.01); *H04B 7/0639* (2013.01); *H04L 25/0204* (2013.01)

(58) Field of Classification Search
CPC .. H04B 7/0456; H04B 7/0639; H04L 25/0204
(Continued)

(56) References Cited

U.S. PATENT DOCUMENTS

2003/0026348 A1   2/2003   Llang et al.
2016/0013850 A1*  1/2016   Zhou ................... H04B 7/0413
                                                                    375/267
(Continued)

FOREIGN PATENT DOCUMENTS

CN    1708966 A   12/2005
CN    1925362 A    3/2007
(Continued)

OTHER PUBLICATIONS

Liang et al., "Downlink Channel Covariance Matrix (DCCM) Estimation and Its Applications in Wireless DS-CDMA Systems," IEEE Journal on Selected Areas in Communications, vol. 19, No. 2, XP11055320AI, pp. 222-232, Institute of Electrical and Electronics Engineers, New York, New York (Feb. 2001).
(Continued)

*Primary Examiner* — Helene E Tayong
(74) *Attorney, Agent, or Firm* — Leydig, Voit & Mayer, Ltd.

(57) ABSTRACT

The present disclosure provides a device, a base station device, and a method for obtaining an estimate of a downlink (DL) covariance matrix from an uplink (UL) covariance matrix. The device and method are particularly suitable for massive Multiple Input Multiple Output (MIMO) scenarios, and are particularly applicable to Frequency-Division Duplexing (FDD) systems. The device includes a processor configured to compute an angular power spectrum (APS) of an antenna array, in particular in the continuous angular domain, based on the UL covariance matrix of a communication channel and an UL response of the antenna array.

(Continued)

Further, the processor is configured to compute the DL covariance matrix of the communication channel based on the APS and a DL response of the antenna array. The base station device includes the device and the antenna array.

15 Claims, 3 Drawing Sheets

(51) Int. Cl.
  *H04B 7/06*    (2006.01)
  *H04L 25/02*   (2006.01)
(58) Field of Classification Search
  USPC .......................................................... 375/267
  See application file for complete search history.

(56) References Cited

U.S. PATENT DOCUMENTS

2019/0245602 A1* 8/2019 Wang ................ H04L 25/03012
2019/0349035 A1* 11/2019 Yang .................... H04B 7/0417

FOREIGN PATENT DOCUMENTS

| CN | 102013952 | A | 4/2011 |
| CN | 106850015 | A | 6/2017 |
| WO | 0135537 | A2 | 5/2001 |
| WO | 2008051845 | A2 | 5/2008 |
| WO | 2014101170 | A1 | 7/2014 |

OTHER PUBLICATIONS

Decurninge et al., "Riemannian coding for covariance interpolation in massive MIMO frequency division duplex systems," 2016 IEEE Sensor Array and Multichannel Signal Processing Workshop (SAM), pp. 1-5, Institute of Electrical and Electronics Engineers, New York, New York (Sep. 2016).

Noh et al., "Pilot Beam Pattern Design for Channel Estimation in Massive MIMO Systems," IEEE Journal of Selected Topics in Signal Processing, vol. 8, No. 5, XP11558887AI, pp. 1-15, Institute of Electrical and Electronics Engineers, New York, New York (Oct. 2014).

Jordan et al., "Conversion from Uplink to Downlink Spatio-Temporal Correlation with Cubic Splines," VTC Spring 2009—IEEE 69th Vehicular Technology Conference, pp. 1-5, Institute of Electrical and Electronics Engineers, New York, New York (Jun. 2009).

Luo et al., "DL CSI Acquisition and Feedback in FDD Massive MIMO via Path Aligning," 2017 Ninth International Conference on Ubiquitous and Future Networks (ICUFN), XP33130344AI4, pp. 349-354, Institute of Electrical and Electronics Engineers, New York, New York (Jul. 2017).

Luenberger, "Optimization by Vector Space Methods," pp. 1-63, Wiley & Sons, New York, New York (1969).

Bauschke et al., "Extrapolation algorithm for affine-convex feasibility problems," Numerical Algorithms, vol. 41, No. 3, pp. 239-274, Springer Press, New York, New York (2006).

Ericsson, ST-Ericsson, "On CSI feedback for IMT-Advanced Fulfilling CoMP Schemes," 3GPP TSG RAN WG1 Meeting #57bis, Los Angeles, USA, R1-092737, total 3 pages, 3rd Generation Partnership Project, Valbonne, France (Jun. 29-Jul. 3, 2009).

CN/20188092164.8, Office Action/Search Report, dated Mar. 31, 2021.

* cited by examiner

CHANNEL COVARIANCE MATRIX CONVERSION

CROSS-REFERENCE TO RELATED APPLICATIONS

This application is a continuation of International Patent Application PCT/EP2018/059441, filed on Apr. 12, 2018, the disclosure of which is hereby incorporated by reference in its entirety.

TECHNICAL FIELD

The present disclosure is concerned with estimating a downlink (DL) channel spatial covariance matrix (in short "DL covariance matrix") of a communication channel. To this end, the present disclosure provides a device, a base station device, and a method for respectively obtaining the estimate of the DL covariance matrix from an uplink (UL) channel spatial covariance matrix (short "UL covariance matrix") of the same communication channel. Accordingly, the present disclosure relates to channel covariance matrix conversion. The devices and method are particularly suitable for massive Multiple Input Multiple Output (MIMO) scenarios. Further, the devices and method are particularly applicable to Frequency-Division Duplexing (FDD) systems.

BACKGROUND

In a massive MIMO scenario, in order to make the acquisition of DL Channel State Information (CSI) feasible, many conventional approaches rely on the knowledge of the DL covariance matrix. If these conventional channel acquisition approaches for MIMO systems were naively extended to massive MIMO systems, information about the DL covariance matrices should be obtained at the User Equipment (UE) from DL pilot sequences, and some information about the covariance matrices (e.g., the index of a matrix in a matrix codebook) should be fed back to the base station (BS).

However, if the number of antennas at the BS is sufficiently large, as envisioned in massive MIMO systems, approaches of this type are infeasible because of the large feedback overhead. That is, if such a conventional approach were used, most of the channel coherence time would be spent on the transmission of pilot or control symbols, instead of the transmission of data.

To address this limitation of the conventional CSI acquisition approaches, researchers have been proposing schemes in which the DL covariance matrix is estimated from the UL covariance matrix. The reason for this is that obtaining information about the UL covariance matrix at the BS is a much simpler task than obtaining information about the DL covariance matrix via control channels.

In Time Division Duplexing (TDD) systems, due to the channel reciprocity, the DL and UL covariance matrices are identical. Thus, estimating the DL covariance matrix from the UL covariance matrix is rather trivial in this case. In contrast, however, in FDD systems the two matrices differ, and an estimation of the DL covariance matrix from the UL covariance matrix is thus by no means trivial.

Some conventional approaches have addressed this inherent problem of FDD systems. All of these approaches are based on assumptions on the channel angular reciprocity. However, the best performing approaches require a training phase to acquire a training set of samples of the UL and DL covariance matrices. Disadvantageously, such a training phase significantly reduces the spectral efficiency. Other approaches, which do not require a training phase, show worse performance.

SUMMARY

In view of the above-mentioned challenges, the present disclosure aims to improve the conventional approaches of estimating the DL covariance matrix from the UL covariance matrix, in particular in FDD systems. Accordingly, the present disclosure provides a device and method for estimating a DL covariance matrix of a communication channel from an UL covariance matrix of the same channel. Thereby, particularly, a training-free solution is desired, i.e. a training phase can be avoided. Further, solutions of the present disclosure can achieve at least a performance comparable to that of the best performing conventional approaches with training phase.

One or more solutions of the disclosure require only knowledge of the antenna array response of an antenna array, e.g. located at the BS, and relies on the frequency invariance property of the angular power spectrum (APS) of the antenna array. The APS is a function that describes the received/transmitted power at the antenna array (e.g. at the BS) for a given direction of arrival or direction of departure. This assumption is reasonable for typical duplex gaps.

A first aspect of the present disclosure provides a device for obtaining a DL covariance matrix of a communication channel, the device comprising a processor being configured to compute an APS of an antenna array, in particular in the continuous angular domain, based on an UL covariance matrix of the channel and an UL response of the antenna array, and compute the DL covariance matrix of the channel based on the APS and a DL response of the antenna array.

The device of the first aspect is accordingly able to obtain the DL covariance matrix from the UL covariance matrix, particularly for FDD systems, in an accurate manner. Thereby, the device does not need to implement a training phase. Accordingly, the device is able to operate with a spectral efficiency that is superior to the best performing conventional approaches. Further, the performance of the device in obtaining the DL covariance matrix is comparable with these best performing conventional approaches that use a training phase. In other words, the device of the first aspect significantly improves the conventional approaches.

In an implementation form of the first aspect, the processor is configured to compute the APS by computing a solution to a feasibility problem including a determined constraint.

Modelling the computation of the APS as a feasibility problem allows the DL covariance matrix to be obtained from the UL covariance matrix with a high performance.

The objective of a feasibility problem is to find a vector satisfying known properties of an estimandum. Here, the estimandum is the APS, which belongs to the intersection of sets constructed with measurements of the uplink covariance matrix and with other prior information. The main idea of the feasibility problem is that, by computing a vector that is an element of all sets, the vector is a good approximation of the APS because it satisfies all known properties of the APS.

In a further implementation form of the first aspect, the solution to the feasibility problem is element of closed convex sets belonging to a determined Hilbert space.

A closed convex set is a convex set that contains all its limit points. A convex set is a subset of an affine space that is closed under convex combinations. A Hilbert space is a generalization of a Euclidean space. A Hilbert space is in particular an abstract vector space possessing the structure of an inner product that allows length and angle to be measured. The concepts of closed convex sets and Hilbert spaces are per se common general knowledge.

The definition of the feasibility problem in a Hilbert space allows using projection methods to solve the feasibility problem. This enables enhanced performance, and allows an easy adjustment of the solution to specific antenna array geometries and polarization.

In a further implementation form of the first aspect, the determined Hilbert space is a Hilbert space of real square Lebesgue integrable functions equipped with an inner product depending on a geometry and/or polarization of the antenna array.

Lebesgue integrable functions are per se common general knowledge. Solutions of the disclosure can be easily adjusted to different geometries of the antenna array by simply changing the inner product of the Hilbert space.

In a further implementation form of the first aspect, the processor is configured to compute the solution to the feasibility problem by using a set-theoretic method.

In particular, existing set-theoretic methods may here be used.

In a further implementation form of the first aspect, the processor is configured to compute the solution to the feasibility problem by using a projection method.

One example of such a projection method is the extrapolated alternating projection method (EAPM).

In a further implementation form of the first aspect, the determined constraint includes that the APS is real-valued.

This constraint enables an algorithm for finding the APS, which has remarkably low computational complexity, while still having very good performance, especially for well designed large arrays (e.g., for large antennas arrays with appropriate antenna inter-spacing). Accordingly this constraint is usable for massive MIMO systems.

In a further implementation form of the first aspect, the determined constraint includes that the APS is a non-negative or positive.

This constraint enables an algorithm for finding the APS, which has remarkable performance even for a smaller number of antennas.

The determined constraint may further include any other constraints based on prior knowledge of the APS (e.g., support information). Such prior knowledge may further improve the performance and reduce the computational complexity.

In a further implementation form of the first aspect, the processor is configured to compute the DL covariance matrix by mapping the UL covariance matrix into its vectorized form by applying a determined vectorization operation, computing a vectorized form of the DL covariance matrix based on the vectorized form of the UL covariance matrix and the solution to the feasibility problem, and mapping the vectorized form of the DL covariance matrix into the DL covariance matrix by applying a reverse of the determined vectorization operation.

This implementation form provides a particular efficient calculation of the DL covariance matrix by using simple vectorization techniques.

In a further implementation form of the first aspect, the UL response and the DL response of the antenna array respectively include components for azimuth and elevation or components for horizontal and vertical polarization.

In this way, also three-dimensional (3D) antenna array geometries can be used as the antenna array and with the solution of the disclosure.

In a further implementation form of the first aspect, the device is configured with the UL response and the DL response of the antenna array, and the device is configured to receive an up-to-date UL covariance matrix of the channel each determined time interval.

The criteria "up-to-date" depends on the speed of the user. The slower the user moves the slower her/his channel properties change and the older an up-to-date UL covariance matrix can be. The speed of the user can be used by the device, in particular when reflected from UE to BS.

In a further implementation form of the first aspect, the antenna array is a massive MIMO antenna array.

The solution of the disclosure shows a particular competitive performance when applied to massive MIMO scenarios.

In a further implementation form of the first aspect, the device is configured to use information from a receiver of the DL, in particular position-based information, for computation of at least one of the APS, the UL covariance matrix, and the feasibility problem.

A second aspect of the present disclosure provides a base station device, comprising at least one device according to the first aspect or any of its implementation forms, and the antenna array.

In an implementation form of the second aspect, the base station device is configured to receive information of a receiver of the DL.

In particular, the received information may be user information that can be used for the computation of the DL covariance matrix.

The base station device achieves all advantages and effects of the device of the first aspect and its implementation forms.

A third aspect of the present disclosure provides a method of obtaining a DL covariance matrix of a communication channel, the method comprising computing an APS of an antenna array, in particular in the continuous angular domain, based on an UL covariance matrix of the channel and an UL response of the antenna array, and computing the DL covariance matrix of the channel based on the APS and a DL response of the antenna array.

In an implementation form of the third aspect, the method comprises computing the APS by computing a solution to a feasibility problem including a determined constraint.

In a further implementation form of the third aspect, the solution to the feasibility problem is element of a closed convex sets belonging to a determined Hilbert space.

In a further implementation form of the third aspect, the determined Hilbert space is a Hilbert space of real square Lebesgue integrable functions equipped with an inner product depending on a geometry of the antenna array.

In a further implementation form of the third aspect, the method comprises computing the solution to the feasibility problem by using a set-theoretic method.

In a further implementation form of the third aspect, the method comprises computing the solution to the feasibility problem by using a projection method.

In a further implementation form of the third aspect, the determined constraint includes that the APS is real-valued.

In a further implementation form of the third aspect, the determined constraint includes that the APS is a non-negative or positive.

In a further implementation form of the third aspect, the method comprises computing the DL covariance matrix by mapping the UL covariance matrix into its vectorized form by applying a determined vectorization operation, computing a vectorized form of the DL covariance matrix based on the vectorized form of the UL covariance matrix and the solution to the feasibility problem, and mapping the vectorized form of the DL covariance matrix into the DL covariance matrix by applying a reverse of the determined vectorization operation.

In a further implementation form of the first aspect, the UL response and the DL response of the antenna array respectively include components for azimuth and elevation or components for horizontal and vertical polarization.

In a further implementation form of the third aspect, the method is configured with the UL response and the DL response of the antenna array, and the method comprises receiving an up-to-date UL covariance matrix of the channel each determined time interval.

In a further implementation form of the third aspect, the antenna array is a massive MIMO antenna array.

In a further implementation form of the third aspect, the method comprises using information from a receiver of the DL, in particular position-based information, for computation of at least one of the APS; the UL covariance matrix; the feasibility problem.

The method of the third aspect and its implementation forms achieve the same effects and advantages as the device of the first aspect and its respective implementation forms.

A fourth aspect of the present disclosure provides a computer program product comprising program code for controlling a device according to the first aspect or any of its implementation forms, or for performing, when implemented on a processor, a method according to the third aspect.

All devices, elements, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Generally, the communication scenario considered by the present disclosure is a typical micro or macro cell environment, e.g. with a BS device equipped with an antenna array having N antennas (N being a natural number$\geq 1$) communicating with a single-antenna UE. However, the approach of the disclosure also works with multiple UEs equipped with multiple antennas.

The present disclosure further exploits the APS frequency invariance property, in order to build the connection between the UL covariance matrix and the DL covariance matrix. In particular, the solution of the present disclosure is based firstly on estimating the APS from the UL covariance matrix and the known UL array response by using, for example, set-theoretic methods, and is based secondly on using the estimated APS and the known DL array response to compute an estimate of the DL covariance matrix.

Figure 1:
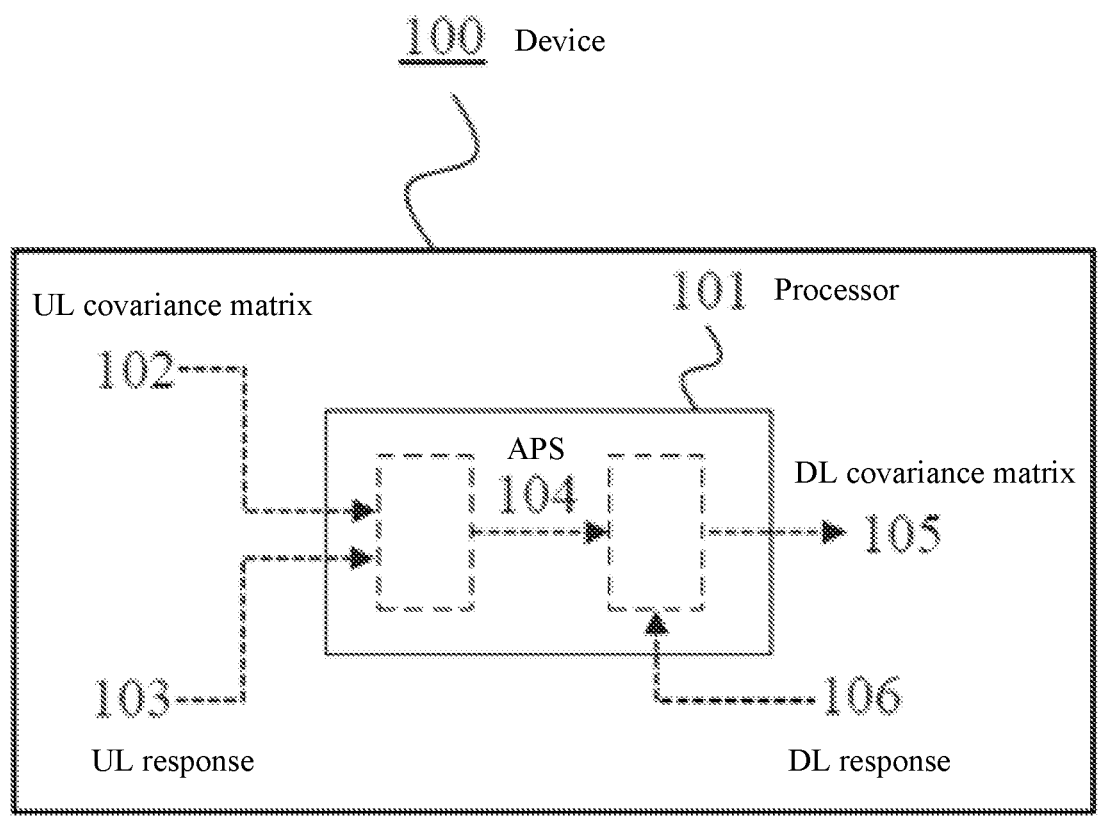
FIG. 1 shows a device according to an embodiment of the present disclosure.

FIG. 1 shows a device 100 according to an embodiment of the present disclosure. The device 100 is configured to obtain a downlink DL covariance matrix 105 of a communication channel. To this end, the device 100 comprises one or more processors 101, the one or more processors 101 being configured to compute the DL covariance matrix 105 based on an APS 104 of an antenna array 201, an UL covariance matrix 102 of the communication channel, an UL response 103 of the antenna array 201, and a DL response 106 of the antenna array 201. Notably, the antenna array 201 does not belong to the device 100, but is e.g. of a BS device 200 (see FIG. 2). The antenna array 201 may in particular be a massive MIMO antenna array.

The at least one processor 101 is specifically configured to compute (indicated by the first dashed block in FIG. 1) the APS 104 of the antenna array 201, in particular in the continuous time domain, based on the UL covariance matrix 102 of the channel and the UL response 103 of the antenna array 201. Further, the at least one processor 101 is configured to compute (indicated by the second dashed block in FIG. 1) the DL covariance matrix 105 of the channel based on the APS 104 and the DL response 106 of the antenna array 201. The device 100 may be (pre-) configured with the UL response 103 and the DL response 106 of the antenna array 201, i.e. the information may be pre-stored in the device 100 or received from e.g. a base station device. Further, the device 100 may be configured to receive an up-to-date UL covariance matrix 102 of the channel each determined time interval. In any case, the UL covariance matrix 102, and the antenna array responses 103 and 106 are assumed to be available at the device 100.

Figure 2:
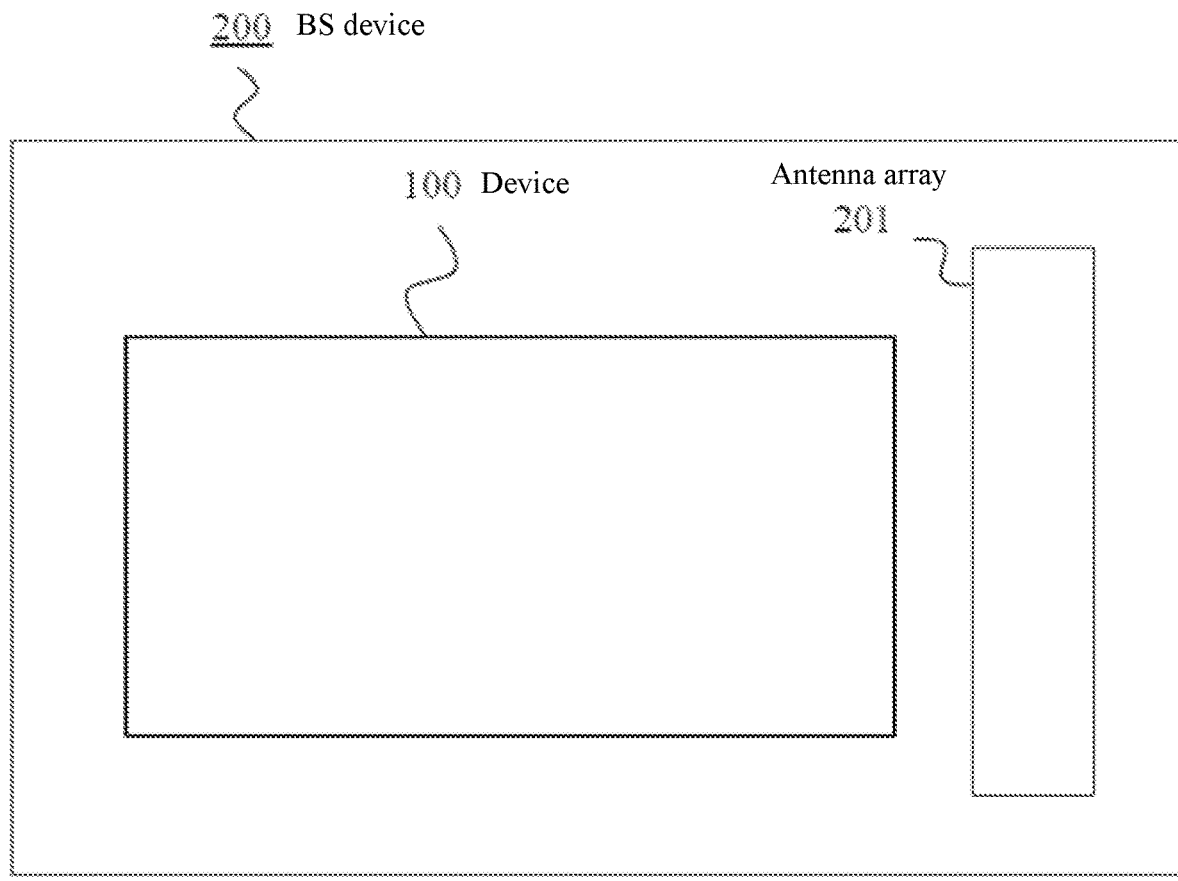
FIG. 2 shows a base station device according to an embodiment of the present disclosure.

FIG. 2 shows a BS device 200 (e.g. a BS or a device provided in a BS system) according to an embodiment of the present disclosure. The BS device 200 includes the device 100 shown in FIG. 1. The BS device 200 may also comprise more than one such device 100. Further, the BS device 200 comprises the antenna array 201, which may be a massive MIMO array. The BS device 200 may be configured to receive information of a receiver of the DL, e.g. a UE, in particular information that allows the BS device 200 to efficiently compute the DL covariance matrix 105.

The relations between the UL and DL spatial channel covariance matrices 102 and 105, the APS 104, and the UL and DL array responses 103 and 106 are detailed in the next sections. Then, two possible examples of specific algorithms are presented for the covariance matrix conversion (i.e. from UL covariance matrix 102 to DL covariance matrix 105). The two algorithms differ in the way the APS 104 is estimated in the first step. Both algorithms can be carried out by the device 100 as shown in FIG. 1 and/or by the BS device 200 as shown in FIG. 2. One of the algorithms ("Algorithm 1") has remarkably low computational complexity, but has nevertheless good performance if the number of antennas of the antenna array 201 is sufficiently large, and the antenna inter-spacing is adequate. The other algorithm ("Algorithm 2") has generally an even better performance, even for a smaller number of antennas in the antenna array 201. The improved performance of Algorithm 2 comes at the cost of a somewhat higher computational complexity compared to Algorithm 1.

In order to provide a basis for the description of these exemplary algorithms, some notations and definitions are now provided. These notations and definitions are then used for the description of the specific algorithms.

A flat-fading MIMO channel between a BS device 200 with N antennas of the antenna array 201 and a single-antenna UE is considered in a 2D (azimuth-only) scenario. For a given carrier frequency, this communication channel $h \in \mathbb{C}^N$ is assumed to be a correlated random vector with a spatial covariance matrix in $\mathbb{C}^{N \times N}$. Furthermore, by highlighting the frequency dependent terms with the superscripts u and d for UL and DL, respectively, for the sake of the clarity, the UL covariance matrix 102 (in the following referred to as $R^u$) and the DL covariance matrix 105 (in the following referred to as $R^d$) are assumed to take the following forms. These forms are common in studies based on Uniform Linear Arrays (ULAs):

$$R^u = \int_{-\pi}^{\pi} \rho(\theta) a^u(\theta) a^u(\theta)^H d\theta, \; R^d = \int_{-\pi}^{\pi} \rho(\theta) a^d(\theta) a^d(\theta)^H d\theta, \quad (1)$$

In the above Eq. (1), $\rho$ is the frequency invariant APS 104 (in the following referred to as $\rho$, and $a^u$ and $a^d$ are the UL antenna array response 103 and the DL antenna array response 106 of the antenna array 201, respectively (in the following referred to as $a^u$ and $a^d$). The adopted channel model is particularly suitable for both narrowband and Orthogonal Frequency-Division Multiplexing (OFDM) systems.

The present disclosure proposes two variants for obtaining $R^d$ from $R^u$, $a^u$ and $a^d$, and according to the model in Eq. (1). Note that $a^u$ and $a^d$ need to be measured only once for the entire system lifetime, because they only depend on the array geometry. In contrast, the knowledge of $R^u$ should be updated regularly, for instance, at least every $T_{WSS}$ seconds, where $T_{WSS}$ defines a window of time, in which the channel can be safely assumed to be wide sense stationary, i.e., in which $R^d$ and $R^u$ do not change significantly. For obtaining $R^u$, $a^u$, $a^d$ standard methodologies may be assumed.

In the description of the exemplary specific algorithms, the following definitions are additionally used:

$$r^u := \text{vec}\{[\Re(R^u), \Im(R^u)]\},$$

$$r^d := \text{vec}\{[\Re(R^d), \Im(R^d)]\},$$

$$g^u(\theta) := \text{vec}\{[\Re(a^u(\theta) a^u(\theta)^H), \Im(a^u(\theta) a^u(\theta)^H)]\},$$

$$g^d(\theta) := \text{vec}\{[\Re(a^d(\theta) a^d(\theta)^H), \Im(a^d(\theta) a^d(\theta)^H)]\},$$

$$\langle f, g \rangle := \int_\Omega f(\theta) g(\theta) d\theta, \Omega \subset [-\pi, \pi],$$

where $\Re(.)$ and $\Im(.)$ denote the component-wise real or imaginary parts, respectively, of complex vectors or matrices. The $\text{vec}\{.\}$ operator is the conventional bijective operator mapping matrices to vectors. Also the subscript m is used to denote the $m^{th}$ element of an M dimensional vector. Further, also the following is defined:

$$G^u = \begin{bmatrix} \langle g_1^u, g_1^u \rangle & \cdots & \langle g_1^u, g_M^u \rangle \\ \vdots & \ddots & \vdots \\ \langle g_M^u, g_1^u \rangle & \cdots & \langle g_M^u, g_M^u \rangle \end{bmatrix}, Q = \begin{bmatrix} \langle g_1^d, g_1^u \rangle & \cdots & \langle g_1^d, g_M^u \rangle \\ \vdots & \ddots & \vdots \\ \langle g_M^d, g_1^u \rangle & \cdots & \langle g_M^d, g_M^u \rangle \end{bmatrix}.$$

The above definitions can be exemplified by using a ULA at the BS device 200, with an antenna spacing d in the antenna array 201, and operating at the UL-DL carrier wavelengths $\lambda^u$ and $\lambda^d$. Further, a 180° (or narrower) cell sectorization is assumed.

For a ULA at the BS device 200, the covariance matrices $R^d$ and $R^u$ are each a respective Hermitian Toeplitz. Therefore, the following vectorization can be considered:

$$\text{vec}\{[\Re(A), \Im(A)]\} := [\Re(A_{(:,1)})^T, \Im(A_{(:,1)})^T]^T,$$

where $A_{(:,1)}$ denotes the first column of a matrix A.

Further, it is set that $$\Omega := \left[-\frac{\pi}{2}, \frac{\pi}{2}\right].$$

With these definitions, by using the standard analytical expression of the ULA array response, the following can be obtained:

$$G^u = \frac{\pi}{2N^2} \begin{bmatrix} G_\Re & 0 \\ 0 & G_\Im \end{bmatrix}, Q = \frac{\pi}{2N^2} \begin{bmatrix} Q_\Re & 0 \\ 0 & Q_\Im \end{bmatrix},$$

where the elements corresponding to the (n,m)-entries of the matrices $G_\Re$, $G_\Im$, $Q_\Re$, $Q_\Im \in \mathbb{R}^{n \times n}$ are given by:

$$G_\Re = J_0(x_{nm}) + J_0(y_{nm}), \; G_\Im = J_0(x_{nm}) - J_0(y_{nm}),$$

$$Q_\Re = J_0(p_{nm}) + J_0(q_{nm}), \; Q_\Im = J_0(p_{nm}) - J_0(q_{nm}),$$

$$x_{nm} = \frac{2\pi d}{\lambda^u}(n-m), \; y_{nm} = \frac{2\pi d}{\lambda^u}(n+m-2),$$

$$p_{nm} = 2\pi d\left(\frac{n-1}{\lambda^d} - \frac{m-1}{\lambda^u}\right), \; q_{nm} = 2\pi d\left(\frac{n-1}{\lambda^d} + \frac{m-1}{\lambda^u}\right),$$

where $J_0$ denotes the Bessel function of the first kind, order zero.

As discussed above, the device 100 and/or BS device 200 is configured to: Firstly, estimate $\rho$ from $R^u$ and $a^u$. Secondly, compute the estimated $R^d$ by using the estimated $\rho$ and $a^d$.

The device 100 and/or BS device 200 may particularly be configured to compute p by computing a solution to a feasibility problem including a determined constraint. In particular, the first step of estimating p may be modelled as the following convex feasibility problem:

$$\text{find } \rho^* \in C, \; C \subset \mathcal{H}$$

where C is a closed convex set belonging to a given Hilbert space $\mathcal{H}$, the definition of which differentiates possible variants of the solution of the disclosure. In other words, the solution to the feasibility problem that the device 100 and/or BS device 200 is configured to solve, is an element of a closed convex set belonging to a determined Hilbert space.

The set C may be constructed based on all available knowledge of $\rho$. As an example, C is mainly constructed with measurements of $R^u$ and prior knowledge on $\rho$, for example, the fact that, being a power density, ρ must be positive and real-valued. Accordingly, the determined constraint of the feasibility problem mentioned above includes that ρ is real-valued and/or that ρ is a non-negative or positive.

In addition, in the proposed algorithms, $\mathcal{H}$ is to be the the Hilbert space of real square Lebesgue integrable functions $L^2[\Omega]$ equipped with the inner product $\langle f,g \rangle := \int_\Omega f(\theta)g(\theta)d\theta$. However, it is possible to modify $\mathbb{R}$ to address different channel models. Possible modifications are discussed later.

In the following, the specific Algorithm 1 is described in detail as an exemplary solution of the disclosure. The device 100 as shown in FIG. 1 and/or the BS device 200 as shown in FIG. 2 are in this case configured to carry out Algorithm 1, particularly by means of the at least one processor 101 of the device 100. In this example, information of p available from $R^u$ is used and also the prior knowledge that ρ is real-valued. More specifically, for the first step of computing ρ of the antenna array 201, the following convex feasibility problem is solved:

find $\rho^* \in V := \cap_{m=1}^M V_m$, $V_m = \{\rho \in \mathcal{H}: \langle \rho, g_m^u \rangle = r_m^u\}$ As a particular solution to the above problem, the projection onto the linear variety V from the function ρ=0 may be used. This projection has the following closed form expression:

$$\rho^* = \sum_{m=1}^M \alpha_m g_m^u$$

where each scalar $\alpha_m$ is computed by solving the linear system $r^u = G^u \alpha$, which has at least one solution. By using this projection ρ*, in the second step of computing the DL covariance matrix, the vectorized version of $R^u$ is obtained from the relation $r^d = Q\alpha$.

The steps of Algorithm 1 can thus be summarized as follows:

The input matrix $R^u$ is mapped into its vectorized form $r^u$.
α* is computed by solving the linear system $r^u = G^u \alpha$.
$r^d = Q\alpha^*$ is computed.
$r^d$ is mapped into the estimated $R^d$ by reversing the vectorization operation.

Notably, Algorithm 1 does not require the explicit computation of the estimated ρ.

Next, the specific Algorithm 2 is described in detail as an exemplary solution of the disclosure. The device 100 as shown in FIG. 1 and/or the BS device 200 as shown in FIG. 2 are in this case configured to carry out Algorithm 2, in particular by means of the at least one processor 101 of the device 100. Algorithm 2 is an extension of Algorithm 1 and includes the knowledge that p is a positive function. In particular, for the first step of the computing p of the antenna array 201, the following convex feasibility problem is solved:

find $\rho^* \in C := V \cap Z$, $V := \cap_{m=1}^M V_m$, $V_m = \{\rho \in \mathcal{H}: \langle \rho, g_m^u \rangle = r_m^u\}$, $Z = \{\rho \in \mathcal{H}: \rho(\theta) \geq 0, \forall \theta\}$.

The above feasibility problem can be solved by using any of the existing set-theoretic methods in the literature. In particular, we can use the iterative approach called "extrapolated alternating projection method" (EAPM), which generates a weakly convergent sequence $(\rho^{(i)})$ with the following recursion:

$\rho^{(i+1)} = \rho^{(i)} + \nu K_i [P_V(P_Z(\rho^{(i)})) - \rho^{(i)}]$, $\rho^{(0)} \in V$.

where the projections are defined by $$P_Z(x) = \begin{cases} x(\theta), & \text{for } x(\theta) \geq 0 \\ 0, & \text{otherwise} \end{cases}, \quad P_V(x) = x - \sum_{m=1}^M \beta_m g_m^u + \sum_{m=1}^M \alpha_m g_m^u,$$

with $\alpha_m$, $\beta_m$ computed by solving $r^u = G^u \alpha$, $b = G^u \beta$, $b_m = \langle x, g_m^u \rangle$.

The starting point of the above algorithm can be set arbitrarily, but here the initial condition) $\rho^{(0)} = \sum_{m=1}^M \alpha_m g_m^u$ is used. The step size v is a design parameter chosen within the interval (0,2), and the extrapolation parameter is given by $$K_i = \begin{cases} \dfrac{\|P_Z(\rho^{(i)}) - \rho^{(i)}\|^2}{\|P_V(P_Z(\rho^{(i)})) - \rho^{(i)}\|^2}, & \text{if } \rho^{(i)} \notin Z \\ 1, & \text{otherwise} \end{cases}$$

Thus, the steps of Algorithm 2 can be summarized as follows:

The input matrix $R^u$ is mapped into $r^u$.
The convex feasibility problem defined above is solved by using, for example, the EAPM algorithm.
$\langle \rho^*, g_m^d \rangle = r_m^d$ is computed for all m.
$r^d$ is mapped into the estimated $R^d$.

The solution of the disclosure can further be extended to 3D (azimuth and elevation) geometries by considering the 3D array responses $a^u(\theta, \varphi)$, $a^d(\theta, \varphi)$ and by redefining the inner product defined further above as:

$$\langle f, g \rangle = \int_\Omega \int f(\theta, \varphi) g(\theta, \varphi) d\theta d\varphi, \Omega \subset ([-\pi, \pi], [-\pi, \pi])$$

In addition, the disclosure can also be extended to polarized antennas by considering the vertical and horizontal polarization array responses ($V^u(\theta)$, $H^u(\theta)$), $V^d(\theta)$, $H^d(\theta)$) and by redefining the inner product defined further above as:

$\langle f, g \rangle = \langle (f_V, f_H), (g_V, g_H) \rangle := \int_\Omega f_V(\theta) g_V(\theta) d\theta + \int_\Omega f_H(\theta) g_H(\theta) d\theta$ The two proposed extensions to the solution of the disclosure can be easily combined or further extended to include more general polarization models, in which the two polarizations do not fade independently.

Figure 3:
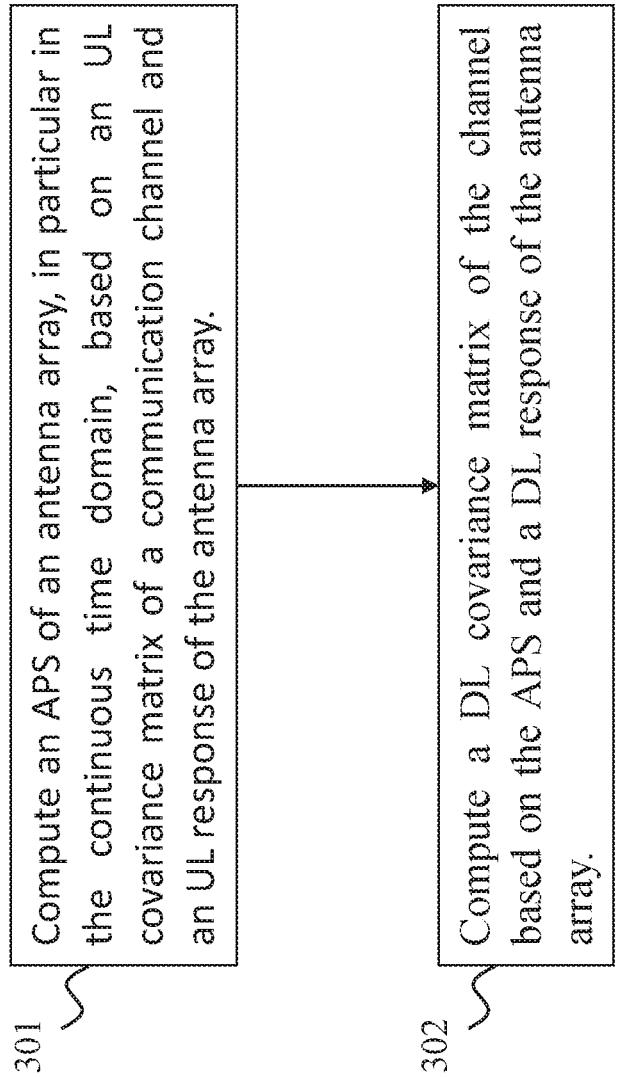
FIG. 3 shows a method according to an embodiment of the present disclosure.

FIG. 3 shows a method 300 according to an embodiment of the present disclosure. The method 300 is particularly for obtaining a DL covariance matrix 105 ($R^d$) of a communication channel. The method 300 may be performed by the device 100 shown in FIG. 1 or the base station device 200 shown in FIG. 2.

The method 300 comprises a step 301 of computing an APS 104 of an antenna array 201, in particular in the continuous time domain, based on an UL covariance matrix 102 ($R^u$) of the channel and an UL response 103 ($a^u$) of the antenna array 201. Further, the method 300 comprises a step 302 of computing the DL covariance matrix 105 of the channel based on the APS 104 (ρ) and a DL response 106 ($a^d$) of the antenna array 201.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A base station device for obtaining a downlink (DL) covariance matrix of a communication channel, the base station device comprising:
    an antenna array; and
    a processor configured to:
        compute an angular power spectrum (APS) of the antenna array based on an uplink (UL) covariance matrix of the communication channel and a UL response of the antenna array, wherein computing the APS of the antenna array comprises computing a solution to a feasibility problem which includes a determined constraint to find a vector that is an element of a plurality of sets constructed with measurements of the UL covariance matrix; and
        compute the DL covariance matrix of the communication channel based on the APS and a DL response of the antenna array.

2. The base station device according to claim 1, wherein the solution to the feasibility problem is an element of a closed convex set belonging to a determined Hilbert space.

3. The base station device according to claim 2, wherein the determined Hilbert space is a Hilbert space of real square Lebesgue integrable functions having an inner product depending on at least one of a geometry and a polarization of the antenna array.

4. The base station device according to claim 1, wherein the processor is configured to compute the solution to the feasibility problem by using a set-theoretic method.

5. The base station device according to claim 1, wherein the processor is configured to compute the solution to the feasibility problem by using a projection method.

6. The base station device according to claim 1, wherein the determined constraint requires that the APS be real-valued.

7. The base station device according to claim 1, wherein the determined constraint requires that the APS be non-negative or positive.

8. The base station device according claim 1, wherein the processor is configured to compute the DL covariance matrix by:
    mapping the UL covariance matrix into a vectorized form by applying a determined vectorization operation;
    computing a vectorized form of the DL covariance matrix based on the vectorized form of the UL covariance matrix and the solution to the feasibility problem; and
    mapping the vectorized form of the DL covariance matrix into the DL covariance matrix by applying a reverse of the determined vectorization operation.

9. The base station device according to claim 1, wherein the UL response and the DL response of the antenna array respectively include components for azimuth and elevation or components for horizontal and vertical polarization.

10. The base station device according to claim 1, wherein the device is configured with the UL response and the DL response of the antenna array, and
    wherein the device is configured to receive an up-to-date UL covariance matrix of the communication channel at a determined time interval.

11. The base station device according to claim 1, wherein the antenna array is a massive Multiple Input Multiple Output (MIMO) antenna array.

12. The base station device according to claim 1, wherein the processor is further configured to use information from a receiver of the DL for computation of at least one of:
    the APS,
    the UL covariance matrix, or
    the feasibility problem.

13. A method of obtaining a downlink (DL) covariance matrix of a communication channel, the method comprising:
    computing, by a base station device, an angular power spectrum (APS) of an antenna array of the base station device based on an uplink (UL) covariance matrix of the communication channel and a UL response of the antenna array, wherein computing the APS of the antenna array comprises computing a solution to a feasibility problem which includes a determined constraint to find a vector that is an element of a plurality of sets constructed with measurements of the UL covariance matrix; and
    computing, by the base station device, the DL covariance matrix of the communication channel based on the APS and a DL response of the antenna array.

14. The method according to claim 13, further comprising:
    receiving, by the base station device, information of a receiver of the DL.

15. A non-transitory computer-readable medium having processor-executable instructions stored thereon for obtaining a downlink (DL) covariance matrix of a communication channel, wherein the processor-executable instructions, when executed, facilitate:
    computing, by a base station device, an angular power spectrum (APS) of an antenna array of the base station device based on an uplink (UL) covariance matrix of the communication channel and a UL response of the antenna array, wherein computing the APS of the antenna array comprises computing a solution to a feasibility problem which includes a determined constraint to find a vector that is an element of a plurality of sets constructed with measurements of the UL covariance matrix; and
    computing, by the base station device, the DL covariance matrix of the communication channel based on the APS and a DL response of the antenna array.

* * * * *